N. COLGEN & O. P. BOYSEN.
TWO ROW POTATO PLANTER.
APPLICATION FILED JUNE 26, 1909.
957,412.
Patented May 10, 1910.
2 SHEETS—SHEET 2.
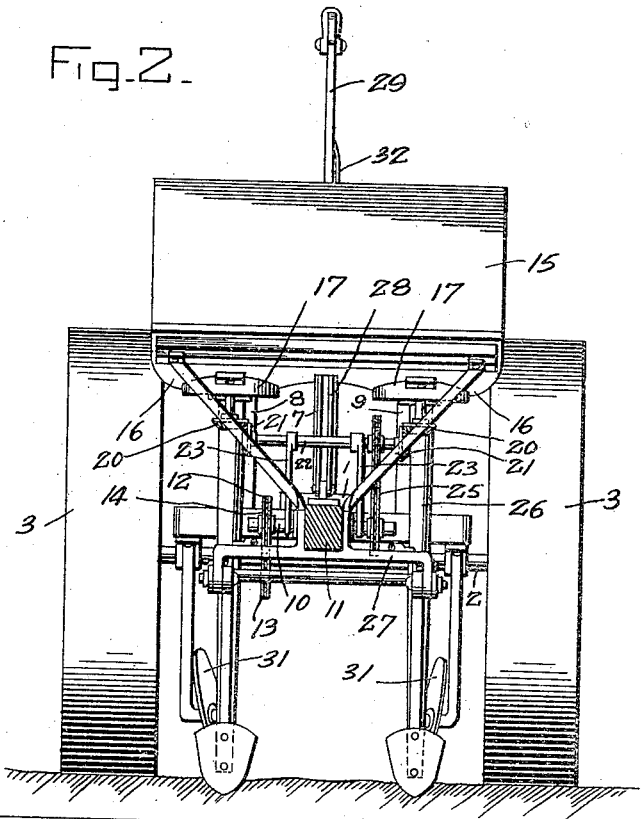
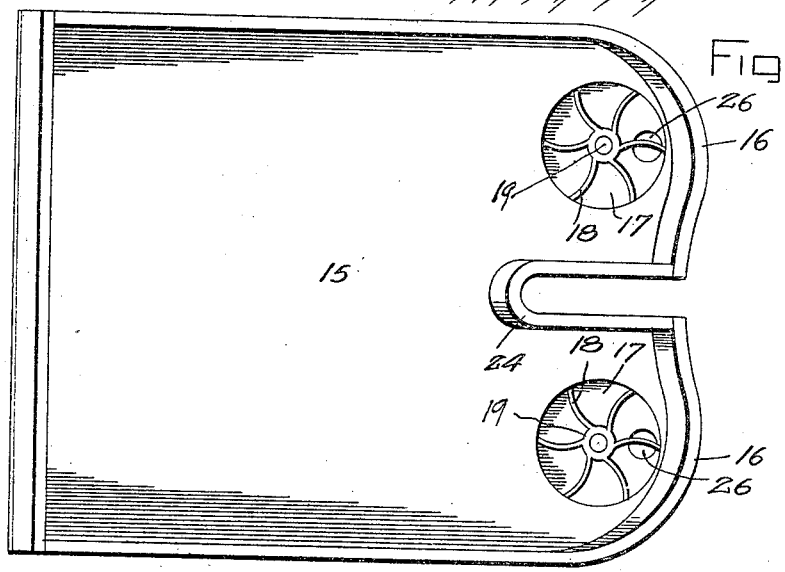

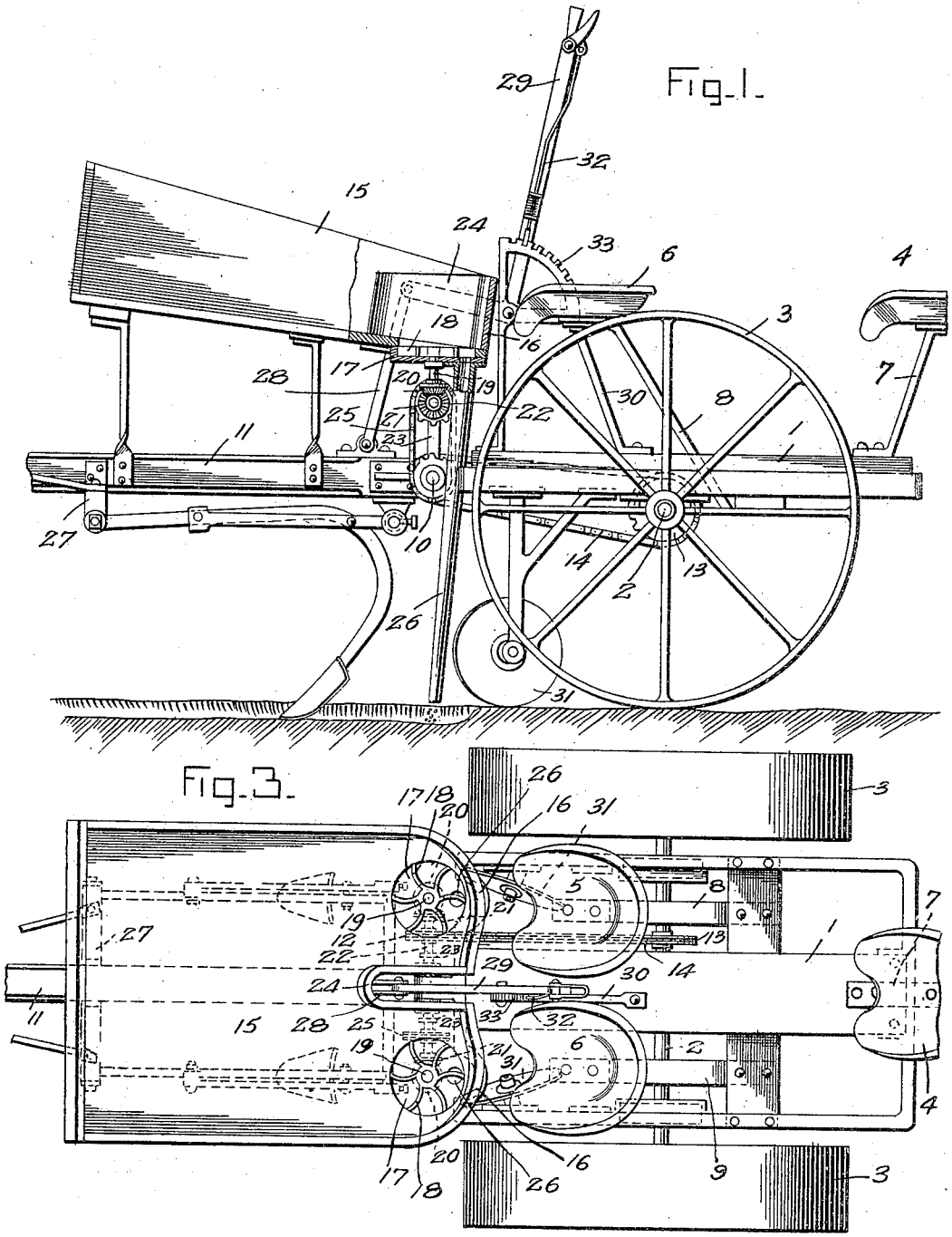

UNITED STATES PATENT OFFICE.

NICHOLAS COLGEN AND OSCAR P. BOYSEN, OF ST. CHARLES, MINNESOTA.

TWO-ROW POTATO-PLANTER.

957,412. Specification of Letters Patent. Patented May 10, 1910.

Application filed June 26, 1909. Serial No. 504,617.

*To all whom it may concern:*

Be it known that we, NICHOLAS COLGEN and OSCAR P. BOYSEN, citizens of the United States, residing at St. Charles, in the county of Winona and State of Minnesota, have invented certain new and useful Improvements in Two-Row Potato-Planters, of which the following is a description.

In the drawing, Figure 1 is a side elevation of a planter embodying our invention; Fig. 2 is a front elevation of the same; Fig. 3 is a top plan view. Fig. 4 is a top plan view of the seed box.

1 represents the main frame of the machine to which is secured the axle 2, on which are journaled traction wheels 3.

4 is the driver's seat and 5 and 6 are seats for the feeders. These seats are mounted on suitable standards 7, 8, and 9, respectively.

10 is a shaft journaled in suitable bearings at the front of the main frame 1, to which the tongue 11 is secured. 12 is a sprocket wheel secured to said shaft 10 and 13 is a sprocket wheel secured to the main axle of the machine, said sprocket wheels being geared together by means of a drive chain 14.

15 is a seed box increasing in depth from the rear toward the front, the rear end of the box having extensions 16 with a countersink 17, in which is secured a feeding wheel 18 mounted on the shaft 19, which shaft terminates in a bevel gear 20, which in turn meshes with a bevel gear 21 keyed to a shaft 22, which shaft is hung in suitable brackets 23 depending from the seed box 15. The shaft 22 extends the width of the seed box and the gearing just described with reference to one of the seed wheels, is duplicated for the other seed wheel. While we have shown six blades on the seed wheels, it is, of course, obvious that this number may be diminished or increased as desired, or found necessary. The seed box is divided by means of the partition 24 which surrounds a slot in the bottom of the box. The shaft 22 is geared to the shaft 10 by means of the sprocket chain 25.

26 are seed tubes depending from the bottom of the countersink 17 in the seed box and communicating therewith by an opening in the bottom of the countersink. These tubes are of any suitable size.

27 is an arm secured to the tongue 11, to each end of which is secured a shovel point or furrow opener, which is positioned immediately in front of the seed tubes, and, of course, projects below the bottom of said tubes, as shown in the side elevation.

28 is a lever, one end of which is pivotally connected to the tongue, while the other end projects through the slot in the bottom of the seed box and is adapted to work between the members of the partition 24.

29 is an operating lever fulcrumed on the standard 30, which is secured to the main frame, the short arm of the operating lever being pivotally secured to the upper end of the lever 28, whereby the depth of the furrow is regulated.

The covering disks 31 are secured to the main frame and are normally positioned back of the seed tubes and are given such inclination with reference to the furrow made by the shovels that they throw the earth back into the furrow over the seed and form hills.

The operating lever is provided with the usual trigger pawl and rod 32, which engages with the ratchet 33 to determine the elevation of the shovel points and covering disks.

The seed are placed in the seed hopper or box 15, which is normally inclined toward the rear, so that the seed will feed by gravity toward the countersinks 17 in the rear of the box into which they fall and from which they are fed by means of the seed feeding wheels 18 into the tubes 26, from which they fall into the furrow made by the shovel points. The covering disks throw the dirt back into the furrow over the seed and form a hill. The depth of the furrow is controlled by the operating lever 29.

Having thus described our invention, what we claim as new therein and desire to secure by Letters Patent is:—

1. In a potato planter, a hopper, comprising a floor inclined from the front toward the rear, a side wall, surrounding said floor and extending inwardly adjacent to the center of one end, whereby the hopper is divided into a plurality of compartments.

2. In a potato planter, a hopper, comprising a floor inclined from the front toward the rear, a side wall, surrounding said floor and extending inwardly adjacent to the center of one end, whereby the hopper is divided into a plurality of compartments, each of said compartments provided with a recess, and feed tubes registering with each of said recesses.

3. In a potato planter, a hopper, comprising a floor inclined from the front toward the rear, a side wall, surrounding said floor and extending inwardly adjacent to the center of one end, whereby the hopper is divided into a plurality of compartments, a countersink formed in each of said compartments, provided with apertures, feeding wheels, mounted within each of said countersinks and means connected to said feed wheels and adapted to rotate them.

4. In a potato planter, a hopper, comprising a floor inclined from the front toward the rear, a side wall, surrounding said floor and extending inwardly adjacent to the center of one end, whereby the hopper is divided into a plurality of compartments, a countersink formed in each of said compartments, provided with apertures, feeding wheels, mounted within each of said countersinks, means connected to said feed wheels and adapted to rotate them, and feed tubes registering with the apertures in the countersinks constructed and arranged to convey the seeds from the countersinks to the furrows.

The foregoing specification signed at St. Charles, Minn., this 8th day of March, 1909.

NICHOLAS COLGEN.
OSCAR P. BOYSEN.

In presence of two witnesses:
CHAS. F. KNAPP,
JOHN REILAND.